No. 708,529. Patented Sept. 9, 1902.
F. CAMENTZ, Jr.
WATER TRAP.
(Application filed Feb. 3, 1902.)
(No Model.)
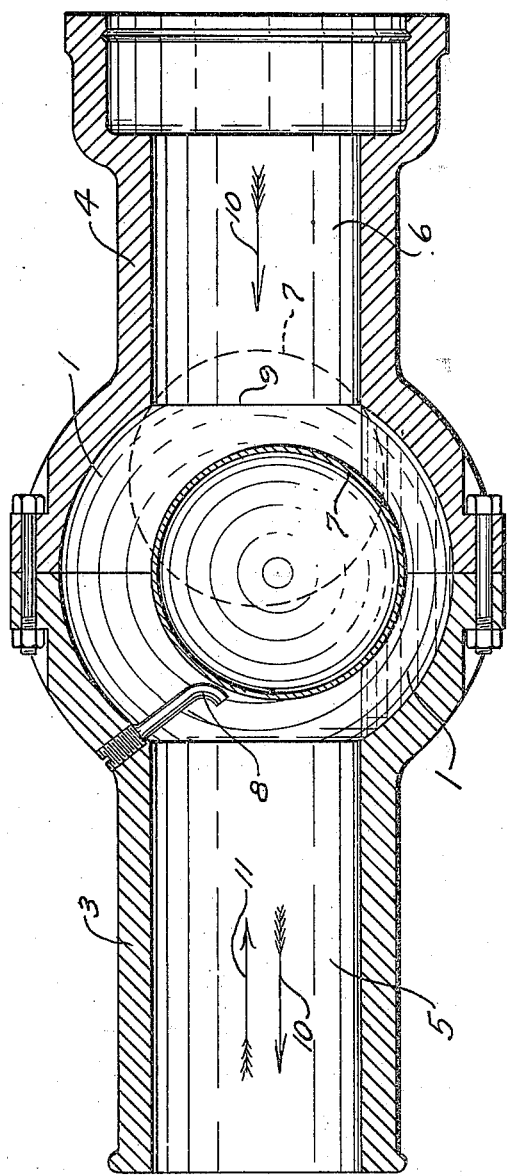
WITNESSES:
INVENTOR.
Fritz Camentz Jr.
BY
Rummler & Rummler
ATTORNEY.

UNITED STATES PATENT OFFICE.

FRITZ CAMENTZ, JR., OF CHICAGO, ILLINOIS.

WATER-TRAP.

SPECIFICATION forming part of Letters Patent No. 708,529, dated September 9, 1902.

Application filed February 3, 1902. Serial No. 92,317. (No model.)

*To all whom it may concern:*

Be it known that I, FRITZ CAMENTZ, Jr., a citizen of the United States of America, and a resident of Chicago, in the county of Cook and State of Illinois, have invented certain new and useful Improvements in Water-Traps, of which the following is a specification.

The main object of my invention is to provide an improved sensitive water-trap or check-valve suitable for insertion in sewer-pipes and similar passages and adapted to permit a free flow of water in one direction and to prevent a return flow. I accomplish this object by the device shown in the accompanying drawing, which represents a longitudinal section of a water-trap constructed according to my invention.

The form of trap shown consists of a section of pipe having therein a globular pocket 1. The shell of the trap is divided transversely into two parts 3 and 4, which are bolted together. The interior of the pocket 1 is considerably larger in diameter than the passages 5 and 6 and has seated therein a hollow spherical float 7. This form of water-trap is intended to be disposed horizontally, as is shown in the drawing. The lower part of the pocket 1 extends a considerable distance below the bottom of the passages 5 and 6 and is adapted to retain a quantity of water. A wire 8, secured to the part 3 of the shell and extending partly across the opening into the passage 5, is adapted to prevent the ball 7 from obstructing the passage 5. The ball 7 is of considerably larger diameter than the passage 6 and is adapted to close the opening 9, which connects the pocket 1 with the passage 6. The wire 8 is preferably provided with a threaded shank received within the section 3 in order that the wire may be adjusted from the exterior of the pipe or entirely removed, if desired. The lower end of the wire is preferably curled outwardly, offering a surface for the float to bear against which will not injure the latter, and extends into the globular passage, so as to prevent the float from closing the opening of pipe 3. Each of the pipe-sections is disposed horizontally, and, as will be noted, the one end of each is flared, the flared ends when in abutting engagement forming a globular pocket on the interior.

The operation of the device shown is as follows: When water flows through the water-trap in the direction of the arrows 10, the ball 7 floats toward the passage 5, but is prevented from entering such passage by the wire 8. After the water has ceased running through the trap a small quantity is retained in the lower part of the pocket 1, and the ball 7 is lightly supported thereon. A return flow of water in the direction of the arrow 11, however slight, will cause the ball 7 to drift across the opening 9 and effectually prevent any considerable quantity of water from returning into the passage 6.

It will be seen that some of the details of construction of the device shown may be altered without departing from the spirit of my invention. I therefore do not confine myself to such details except as hereinafter limited in the claims.

What I claim as my invention, and desire to secure by Letters Patent, is—

1. A device of the type set forth, comprising two horizontal sections of pipe having their ends flared and in abutting engagement forming an interior globular pocket, the lower portion of the pocket adapted to receive a liquid extending in alinement with the lower portions of the pipe-sections, a float adapted to be supported by the liquid, with a means extending through one of said pipe-sections and into said globular pocket for engagement with the float, said means being adjustable from the exterior of the pipe.

2. A device of the type set forth, comprising horizontal sections of pipe having their ends flared and bolted together, forming an interior globular pocket between the openings of the pipes, said pocket adapted to receive a liquid extending in alinement with the lower portions of the pipe-sections, a float supported by the liquid, and a wire screwed into one of the pipe-sections and extending within said globular pocket.

3. A device of the type set forth, comprising horizontal sections of pipe having their ends flared and secured together forming an interior globular pocket, the lower portion of which is adapted to receive a liquid extending flush with the lower portions of the pipe, a float supported by the liquid, and a means extending within the globular pocket and to the front of the opening of one of the pipe-sections for engagement with said float.

Signed at Chicago this 31st day of January, 1902.

FRITZ CAMENTZ, JR.

Witnesses:
EUGENE A. RUMMLER,
WM. R. RUMMLER.